Nov. 8, 1932.                C. KRAUS ET AL                1,887,059
                              CRUSTACEAN TRAP
                    Filed July 3, 1930           4 Sheets-Sheet 1
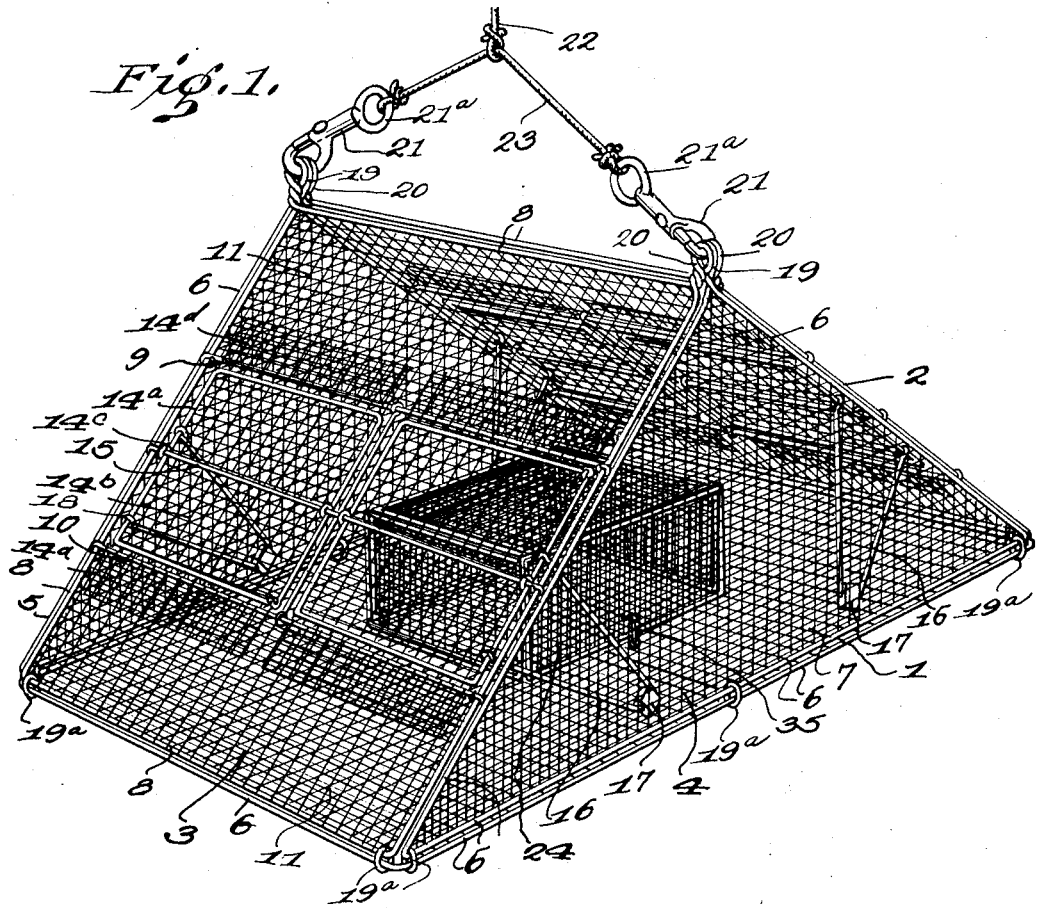
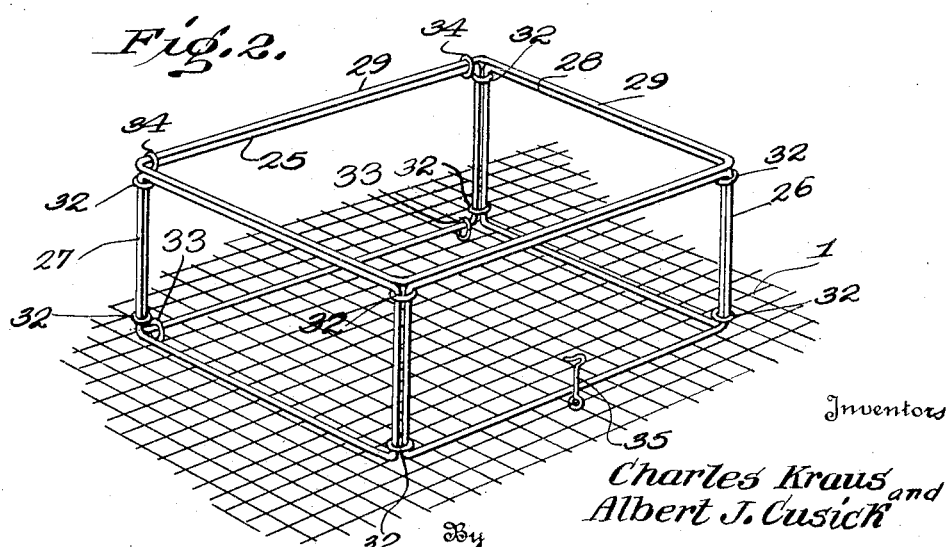
Inventors
Charles Kraus and
Albert J. Cusick
By Milans & Milans
Attorneys

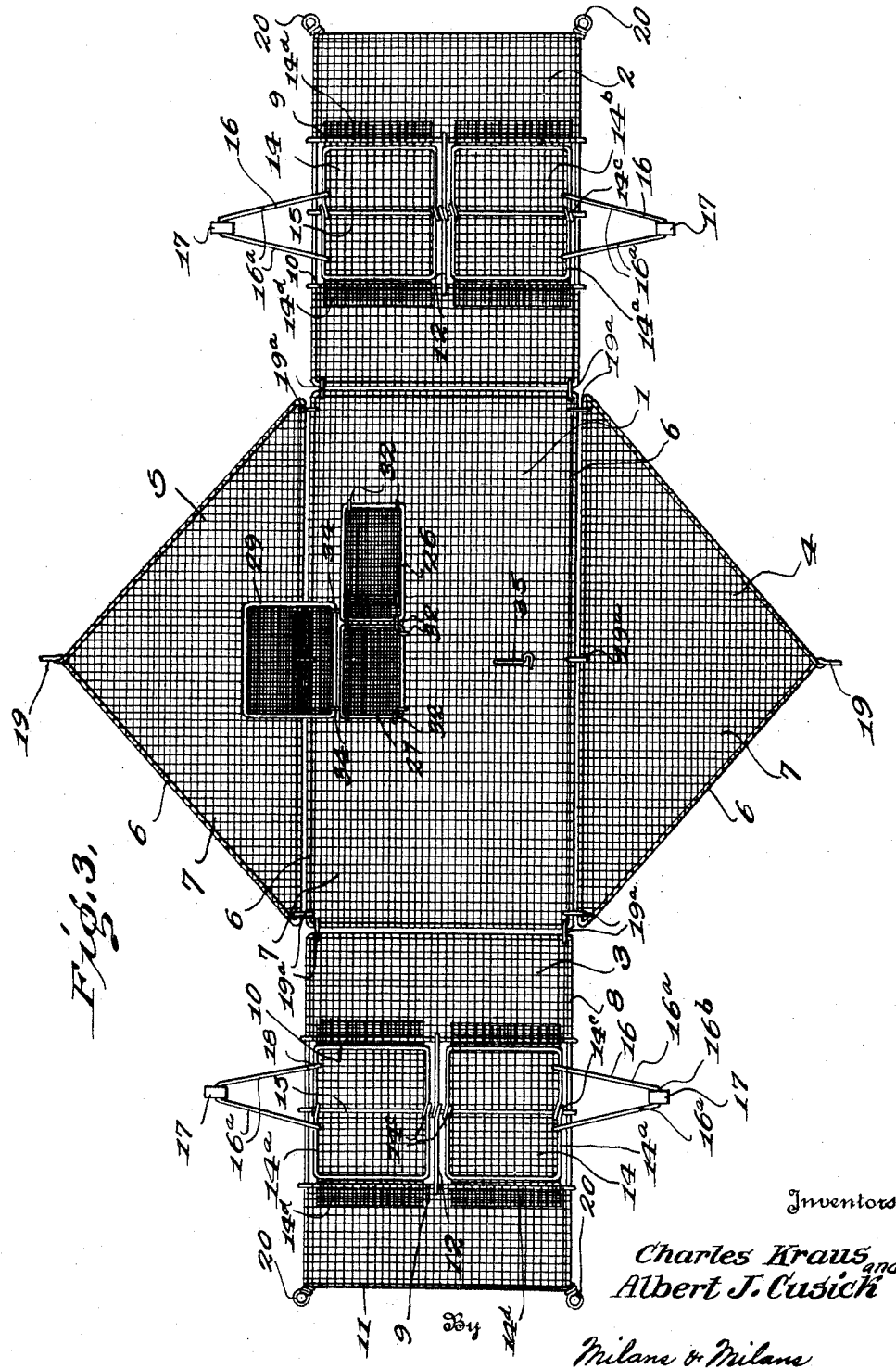

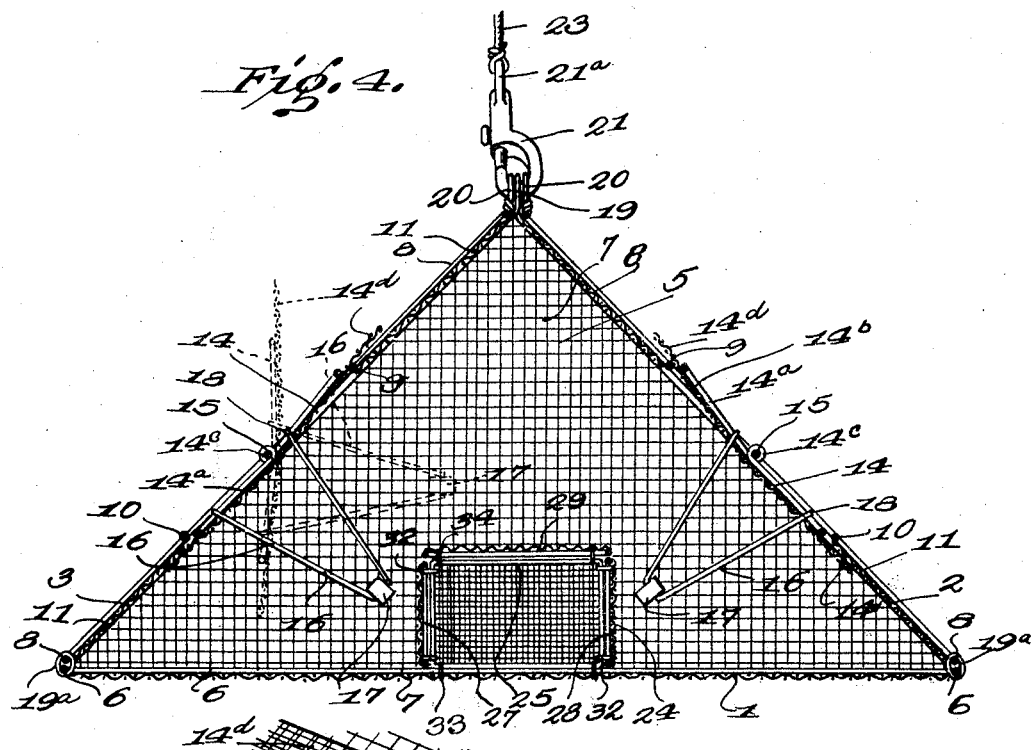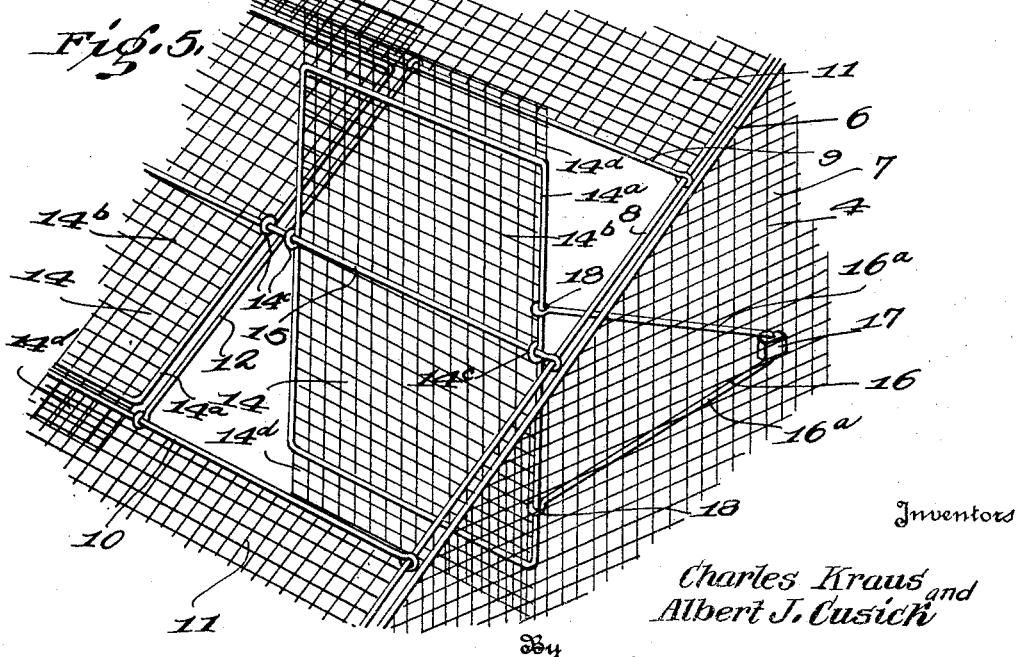

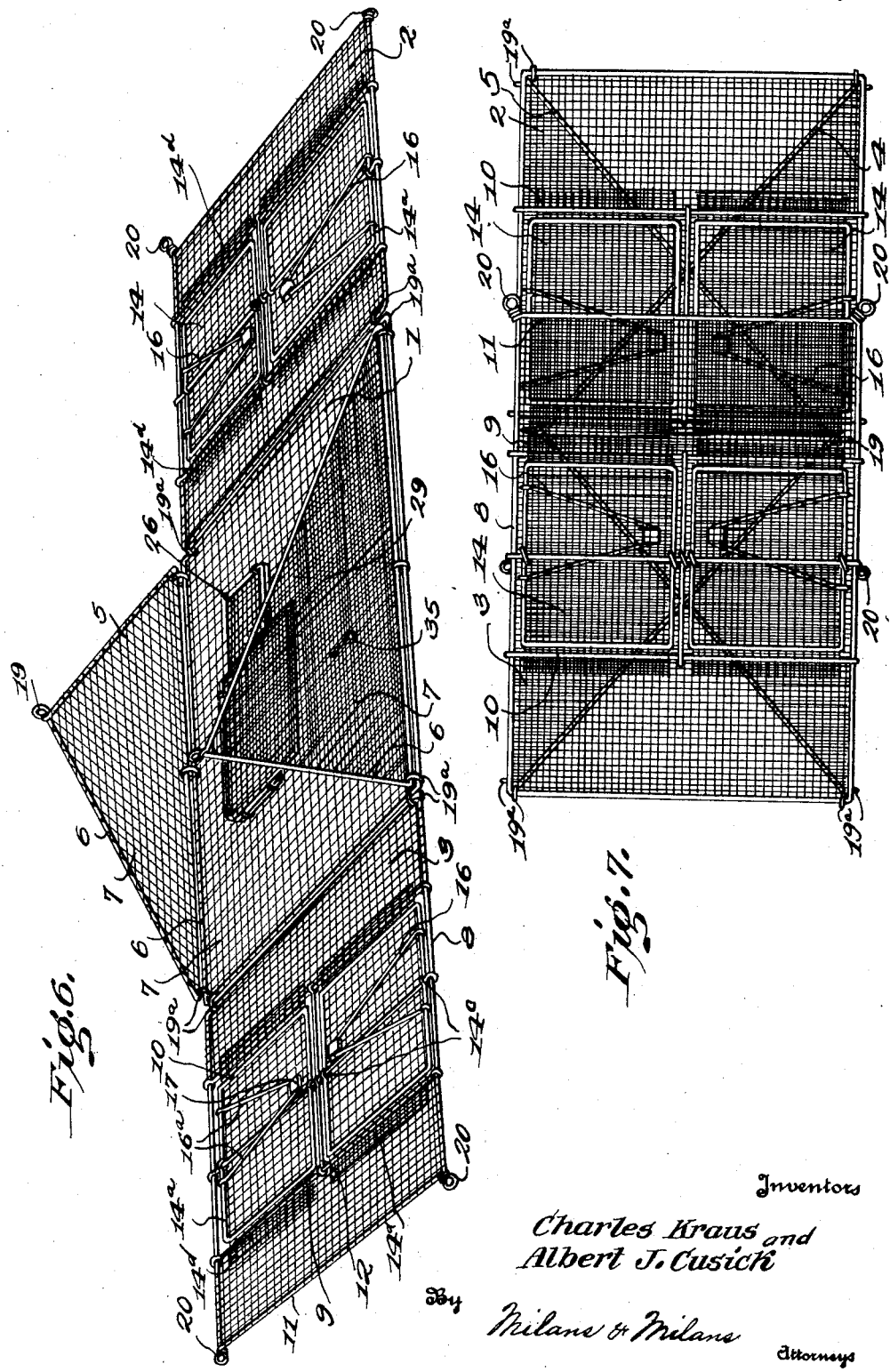

Patented Nov. 8, 1932

1,887,059

UNITED STATES PATENT OFFICE

CHARLES KRAUS AND ALBERT J. CUSICK, OF NEW ORLEANS, LOUISIANA

CRUSTACEAN TRAP

Application filed July 3, 1930. Serial No. 465,722.

This invention relates to improvements in traps, and more especially to traps particularly adapted for catching crabs and lobsters.

An object of the invention is to provide an improved, efficient trap of the class referred to that can be completely collapsed for storage and other purposes.

Other objects of the invention are to provide an improved trap of the character mentioned that will be easy to operate, that can be easily assembled and quickly unfastened to remove the catch, and which will be of a simple, practical construction that can be economically manufactured.

The invention, with other objects and advantages thereof, and the particular construction, combinations, and arrangements of parts comprising the same, will be understood from the following detailed description, when considered in connection with the accompanying drawings, forming part hereof and illustrating one embodiment of the invention.

In the drawings:

Figure 1 is a perspective view of a trap constructed in accordance with the present invention;

Figure 2 is an enlarged detail perspective view of the main frame portions of the bait box;

Figure 3 is a top plan view of the trap collapsed with the end members and side members of the same swung outwardly prior to folding the same inwardly upon the bottom member;

Figure 4 is a vertical longitudinal sectional view taken on a line extending centrally of two of the trap doors and centrally of the bait box;

Figure 5 is an enlarged fragmentary detail perspective view showing one of the trap doors in partially open position, and another of the trap doors in closed position;

Figure 6 is a perspective view of the trap in a partly folded condition; and

Figure 7 is a top plan view of the trap in folded form.

While a preferred embodiment of the invention is illustrated in the drawings, it will of course be understood that minor changes and variations may be made in the particular construction shown, and the invention embodied in other forms, as will appeal to those skilled in the art, and falling within the scope of the appended claims, without departing from the spirit of the invention.

Referring to a detailed description of the particular embodiment of the invention illustrated in the drawings, the trap body is triangular shape in cross-section, the same having a rectangular shaped bottom member 1, rectangular shaped side members 2 and 3, and triangular shaped end members 4 and 5. The bottom member 1 and end members 4 and 5 are each formed of a wire frame 6 covered by a netting 7 of wire or other suitable material. The side members 2 and 3 each comprise a rectangular shaped wire frame 8 with rods 9, 10, secured to and extending between opposite sides of the frame at intervals along the same, dividing the frame into three sections, the side frame sections thus formed being enclosed by a netting 11 of wire. Extending centrally of the sides of the frame 8 between and secured to the rods 9, 10, is a rod 12, which with the rods 9, 10, and the intermediate side portions of the frame 8 form door frames, as shown, for a pair of trap doors 14 disposed side by side, there being a pair of such trap doors 14 in each of the inclined side members 2 and 3. Referring particularly to Figure 5 of the drawings, each trap door 14 is shown as consisting of a rectangular shaped wire frame $14^a$ covered by a section of wire netting $14^b$. Each pair of doors 14 is hinged intermediate their ends to swing vertically on a rod 15, which extends transversely of the side frame 8 about midway between the ends of the frame, the frame $14^a$ of each trap door having eyes $14^c$ on the sides thereof engaging the said rod. The section of wire netting $14^b$ of each trap door 14 has end portions $14^d$ projecting beyond the ends of the frame $14^a$ of the door to overlap and abut against the rods 9 and 10 of the door frame, as illustrated in full lines in Figure 4 of the drawings, when the door is in closed position, said end portions of the section of wire netting $14^b$ serve as stops to limit the swinging movement of the trap door 14 in one direction. The trap doors are each provided with a weighted arm 16, which serves to counterbalance the trap door and yieldingly hold the same in closed position, said arm 16 having a lateral hinge connection with the frame 14ª of the door for a purpose which will hereinafter appear. Each weighted arm 16 of the trap doors 14, is shown of general U-shaped form constructed from a continuous piece of wire bent upon itself, and comprising spaced side members 16ª and an intermediate connecting portion 16ᵇ, the side members 16ª lying in a common plane and diverging outwardly from the intermediate portion 16ᵇ.

At the outer end of the arm 16 is attached a weight 17, the weight having a bore engaged by the intermediate portion 16ᵇ of the arm and being held in position thereon between the inner end portions of the side members 16ª. The side members 16ª at their outer ends have eyes 18 engaged with a side rod of the frame 14ª of the trap door, the eyes 18 being held fixed against movement longitudinally on said rod and providing a hinged connection between the parts. The places on the said side rod of the frame 14ª, which are engaged by the eyes 18 of the arm 6, may be slightly bent or offset to assist in holding the eyes 18 fixed against movement longitudinally on said rod. As will be understood, each trap door 14 is adapted to be pushed open by inward pressure upon the lower part thereof by a crab or lobster, and to automatically close as soon as the crustacea has passed by the lower part of the trap door into the trap.

The side members 2, 3, and the end members 4, 5, of the trap body are loosely hinged to the bottom member 1 by loops or eyes 19ª of wire or the like, said loops or eyes embracing contiguous rods of the frames of said members, as shown, and said members being adapted to be arranged and fastened together in elevated position to form a closed receptacle or cage as illustrated in Figure 1 of the drawings, and to be collapsed and folded one upon the other as shown in Figure 7, the hinge connections of the weighted arms 16 with the frames 14ª of the trap doors 14, providing for folding said weighted arms inwardly flat against the side members 2 and 3.

On the frames 6 of the end members 4, 5, at the top thereof, are eyes 19, and the frames of the side members 2, 3, have at their outer ends at either side eyes 20. The eye 19 of each of the end members 4, 5, is disposed alongside an eye 20 of each one of the side members 2, 3, when said members are arranged in the elevated position illustrated in Figure 1, and snap hooks 21 are provided to engage the separate sets of eyes 19, 20 and fasten the side members, 2, 3, and end members 4, 5, together. The snap hooks 21 also afford means for connecting an operating line 22 to the trap body. A length of chain or rope is secured at each end to one of the eyes 21ª of the snap hooks 21 to form a loop 23, to which the hoisting line 22 is secured.

On the upper side of the bottom member 1 of the trap body centrally thereof, is a bait box 24. The bait box 24 is rectangularly shaped, the same comprising side members 25, 26, end members 27, 28, and a top member 29, each of said members comprising, as shown a rectangularly shaped wire frame inclosed by a netting of wire.

The side members 25, 26, and end members 27, 28, are loosely hinged together by loops or eyes 32 embracing contiguous rods of the frames of the members. The side member 25 is loosely hinged to the netting 7 of the bottom member 1 of the trap body by metal loops or rings 33 embracing a rod of the frame of said side member, and the top member 29 at one side is hingedly connected to the side member 25 by metal loops or eyes 34, the bait box being adapted to be collapsed as illustrated in Figure 6 of the drawings. 35 designates a hook pivotally connected at one end to the netting 7 of the bottom member 1 and adapted to be engaged with the netting of the side member 26 to detachably secure the same in elevated position, as shown in Figure 1.

The trap including the bait box 24 is completely collapsible, the same being shown in collapsed and folded form in Figure 7 of the drawings. When the snap hooks 21 have been disengaged from the sets of eyes 19, 20, of the side and end members, the same can be swung outwardly to the position illustrated in Figure 3 of the drawings, and the bait box 24 can be collapsed as shown in this view, after the hook 35 has been disengaged from the netting 31 of the side member 26 of the bait box. The parts can then be further folded one upon the other from the position illustrated in Figure 3, as follows: Fold the top member 29 of the bait box inwardly down flat upon the folded sides and end members 25, 26, 27, 28, to the position illustrated in Figure 6 of the drawings. Then fold end member 4 of the trap inwardly and over the collapsed bait box 24. Next fold end member 5 inwardly on top of the side member 4. Then fold the weighted arm 16 inwardly against the side members 2, 3, as shown in Figure 6, and continue by folding each of the side members 2, 3, inwardly and over the members previously folded.

The length of the side members 2, 3, and the greatest width of the end members 4, 5, including the eyes 19 at the upper portions thereof, as shown, corresponds with the width of the bottom member 1, and the wire loops 19ª, which hingedly connect the side members 2, 3, and end members 4, 5, to the bottom member 1, and the loop hinges 32, which connect the members of the bait box 24, are sufficiently large to provide for the folding of the members one upon another to the form illustrated in Figure 7 of the drawings.

It will be noted that the particular construction and arrangements of parts, hereinbefore set forth, provides a trap that will be efficient in use, which is completely collapsible into compact form for storage or other purposes, and which can be economically manufactured. The device can be easily operated, the special means provided for fastening the frame members together being of a simple, efficient character, providing for quickly connecting the collapsible sections together in elevated or set up position, and for the ready disconnection of the same when it is desired to collapse the trap or to remove the catch, said fastening means also serving as means for connecting an operating line to the trap.

What we claim is:

1. A trap comprising a body including a rectangular shaped bottom member, rectangular shaped side members, and triangular shaped end members, said body being triangular shape in cross-section and the side members being inclined toward each other, one of said sloping side members being provided with an opening and a vertically swinging trap door at the said opening, and means for yieldingly maintaining said trap door in closed position extending substantially coextensive with said side member.

2. A trap comprising a body having a sloping side wall provided with an opening, a vertically swinging trap door mounted on the said side wall at said opening, and means for yieldingly maintaining said trap door in closed position extending substantially coextensive with said sloping side wall.

3. A trap comprising a collapsible body including a bottom member, side and end members hinged to said bottom member, means for detachably fastening the side members and end members together in elevated position, and a collapsible bait box on the bottom member, said bait box having rectangularly shaped side and end members hinged together, and a top member hinged at one side to one of said members, one side member of the bait box being hinged at one side thereof to the bottom member of the collapsible body of the trap.

4. A trap comprising a collapsible body having wall members hinged together, one of said wall members being provided with a vertically swinging trap door having a weighted arm acting to normally maintain the trap door in closed position, said weighted arm being hinged to the trap door to fold thereagainst when the trap is collapsed.

5. A trap comprising a collapsible body having wall members hinged together, one of said wall members being provided with a vertically swinging trap door, an arm having a lateral hinge connection with said trap door, and a weight on the outer end portion of said arm, said arm yieldingly maintaining the trap door in closed position, and said arm being folded against the said wall member when the trap is collapsed.

6. A trap comprising a collapsible body having wall members hinged together, one of said wall members being provided with a vertically swinging trap door, said trap door comprising a rectangular shaped frame, an arm of general U-shaped form having eyes at its free end portions engaging one side rod of the frame of the trap door and providing a lateral hinge connection between the arm and said side rod, and a weight on the outer end of the arm, said arm serving to yieldingly maintain the trap door in closed position and being folded against said wall member of the collapsible body when said body is collapsed.

7. A trap comprising a body including a rectangular shaped bottom member, rectangular shaped side members, and triangular shaped end members, said body being triangular shape in cross-section and the side members being inclined toward each other, each of the sloping side members being provided with a pair of openings and a pair of trap doors disposed side by side at the said openings and arranged to open inwardly, and each of said trap doors being provided with means for yieldingly maintaining the same in closed position extending substantially coextensive with the side member.

8. A trap comprising a collapsible body including a rectangular shaped bottom member, rectangular shaped side members, and triangular shaped end members, said side and end members being hinged to the bottom member to be arranged in elevated position adjoining each other to form with the bottom member a receptacle triangular shape in cross-section, and said side and end members being foldable inwardly one upon the other upon said bottom member, and independent means for detachably securing each of the end members and the side members together in set up position.

9. A trap comprising a body including a rectangular shaped bottom member, rectangular shaped side members, and triangular shaped end members, said side and end members being hinged to the bottom member to be arranged in elevated position adjoining each other to form with the bottom member a receptacle triangular shape in cross-section, means for detachably securing said side and end members together in set up position, a bait box on the bottom member collapsible thereupon, said bait box comprising wall members hinged together, and means for detachably securing said bait box in set up position, the side and end members of the body being foldable inwardly and downwardly upon the folded bait box and the bottom member.

10. A trap comprising a body including a rectangular shaped bottom member, rectangular shaped side members, and triangular shaped end members, said side and end members being hinged to the bottom member to be arranged in elevated position adjoining each other to form with the bottom member a receptacle triangular shape in cross-section, and said side and end members being foldable inwardly one upon another upon the bottom member, means for detachably securing the side and end members in elevated set up position, one of said side members being provided with a vertically swinging door having a weighted arm to normally maintain the door in closed position, said weighted arm being hinged to the door to fold inwardly thereagainst.

11. A trap comprising a body including a rectangular shaped bottom member, rectangular shaped side members, and triangular shaped end members, said side and end members being hinged to the bottom member to be arranged in elevated position adjoining each other to form with the bottom member a receptacle triangular shape in cross-section, the side and end members each being of a width not exceeding the width of the bottom member and being foldable inwardly one upon the other upon the bottom member, and means for detachably securing the side and end members in elevated position.

12. A trap comprising a body including a rectangular shaped bottom member, rectangular shaped side members, and triangular shaped end members, said side and end members being hinged to the bottom member to be arranged in elevated position adjoining each other to form with the bottom member a receptacle triangular shape in cross-section and to be collapsed, each end member being provided at its upper marginal portion with an eye, and each side member having an eye at each side thereof at its upper end, the eye of each of the end members being disposed side by side with an eye of each of the side members when the side and end members are in elevated position, and independent means for detachably engaging said sets of eyes and fastening the members together, whereby either end member may be released while maintaining the other end member and side members fastened together in elevated position.

13. A trap comprising a body including a rectangular shaped bottom member, rectangular shaped side members, and triangular shaped end members, said side and end members being hinged to the bottom member to be arranged in elevated position adjoining each other to form with the bottom member a receptacle triangular shape in cross-section and to be collapsed, each end member being provided at its upper marginal portion with an eye, and each side member having an eye at each side thereof at its upper end, the eye of each of the end members being disposed side by side with an eye of each of the side members when the side and end members are in elevated position, a snap hook to engage each set of eyes to fasten the members together, whereby either end member may be released while maintaining the other end member and side members fastened together in elevated position, and a loop member having its ends fastened to the eyes of the snap hooks at opposite ends of the trap, and a hoisting line connected to said loop member.

14. A trap including a collapsible body comprising a plurality of members, in combination with a collapsible bait box on one of the members of said body, said bait box comprising wall members hinged together, one of the wall members of the bait box being connected to one of the members of said body, and means for detachably securing the bait box in elevated position.

In testimony whereof we hereunto affix our signatures.

CHARLES KRAUS.
ALBERT J. CUSICK.